June 29, 1943.   R. E. WARD   2,322,757
MOLD FOR HELICAL SPRINGS
Original Filed July 23, 1941

Inventor
RALPH E. WARD

Patented June 29, 1943

2,322,757

UNITED STATES PATENT OFFICE 2,322,757

MOLD FOR HELICAL SPRINGS

Ralph E. Ward, Erie, Pa.

Original application July 23, 1941, Serial No. 403,724. Divided and this application June 16, 1942, Serial No. 447,280

3 Claims. (Cl. 18—34)

This application is a division of my co-pending application, Serial No. 403,724 for Mold for helical springs.

This invention relates to the spring-making art, and, more particularly, to the art of forming springs, by molding and subsequently curing organic thermoplastic materials, in accordance with the process described and claimed in my co-pending application Serial No. 403,768.

In one method of making springs according to the invention disclosed in my co-pending application, Serial No. 403,768, a molded or extruded rod or bar is softened, as by heat, then shaped to a desired spring form, and then immersed in boiling water until it becomes resilient. This method is particularly useful in the manufacture of helical extension springs which must have end loops, and the object of the invention described and claimed in this application is to provide a mold or form in which an extension spring may be made by the described process.

Other objects and features of novelty of the invention will be made apparent by the following description and the annexed drawing, it being understood, however, that such description and drawing are only illustrative of the invention and impose no limitation thereon or on the appended claims.

Referring to the drawing, in which like reference numerals refer to like parts,

Figure 1:
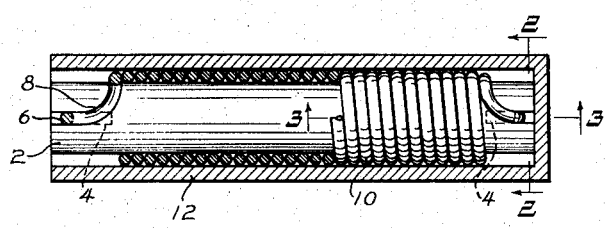
Fig. 1 is a longitudinal view, partly in section and partly in elevation, of a mold according to my invention.
Figure 2:
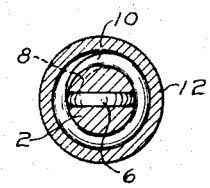
Fig. 2 is a sectional view taken on line 2—2 of Fig. 1.
Figure 3:
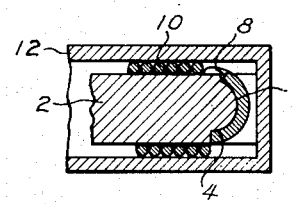
Fig. 3 is a sectional view taken on line 3—3 of Fig. 1.

In the drawing there is illustrated a mold apparatus intended particularly for the formation of extension springs from molded or extruded rods or bars of organic thermoplastic material in accordance with the process described and claimed in my aforesaid co-pending application, Serial No. 403,768. In this apparatus, an inner cylindrical form 2 is provided having at each end a form for the end loop which is necessary in extension springs. Each such loop form comprises a recess 4 formed in the outer wall of the cylindrical form and spaced from the adjacent end thereof, from which a groove in the outer wall passes to the end of the form and is curved over the end, as at 6, and then away from the end and also circumferentially, as at 8, being then of decreasing depth until its bottom merges with the outer wall of the form.

In the use of this apparatus to form an extension spring one end of a rod or bar 10 of organic thermoplastic material which has been softened, as by being passed through water heated to 135 or 150° F., is inserted axially into one of the recesses 4, the adjacent material of the rod or bar being then brought over the end of the form through the groove 6 to provide one end loop, the rod being then coiled about the entire length of the form and the other end of the rod being passed over the end of the form in the groove 6 and anchored in the adjacent recess 4, thus providing the second end loop. The form, with the coiled thermoplastic rod thereon, is then inserted into the outer mold-part 12, the inner diameter of which is of such a size as to tightly fit the outer periphery of the coiled rod, after which the assembly is subjected to the hot immersion step of my invention. The form 2 may then be removed from the outer mold-part and the helix, which is now resilient and spring-like, removed therefrom.

While I have described and illustrated but one form of my invention it will be recognized by those skilled in the art that modification thereof may be made and further embodiments discovered, all without departing in any way from the spirit or scope of the invention, for the limits of which reference must be had to the appended claims.

What is claimed is:

1. A mold for a helical extension spring comprising a hollow cylindrical mold-part, a second cylindrical mold-part disposed concentrically within the outer mold-part and being of such cross-sectional size that an annular space is provided between the two mold-parts which is of sufficient radial extent to receive a helix wound about the inner mold-part and the outer face of which abuts the inner wall of the outer mold-part, the inner mold-part having means formed at at least one end thereof to receive an end of the helix and shaped to form such end as a loop.

2. A mold for a helical extension spring comprising a hollow cylindrical mold-part, a second cylindrical mold-part disposed concentrically within the outer mold-part and being of such cross-sectional size that an annular space is provided between the two mold-parts which is of sufficient radial extent to receive a helix wound about the inner mold-part and the outer face of which abuts the inner wall of the outer mold-part, the inner mold-part having substantially longitudinally extending grooves formed in the ends thereof within which the ends of the helix are received for the formation of loops on the ends of the helix.

3. A mold for a helical extension spring comprising a hollow cylindrical mold-part, a second cylindrical mold-part adapted to be disposed concentrically within the outer mold-part and being of such cross-sectional size that an annular space is provided between the two mold-parts when in such assembled condition, at least one end portion of the second mold-part having a recess in the wall thereof spaced from the end of the mold-part and communicating with a groove in the wall of the mold-part which extends from the recess substantially longitudinally toward the end of the mold-part and is curved across the end of the mold-part and is continued longitudinally and circumferentially of the mold-part in a groove which decreases in depth until the bottom thereof merges with the outer wall of the mold-part, said recess and groove being adapted to receive a rod and to shape it to form the loop on the end of an extension spring.

RALPH E. WARD.